United States Patent Office 2,962,308
Patented Nov. 29, 1960

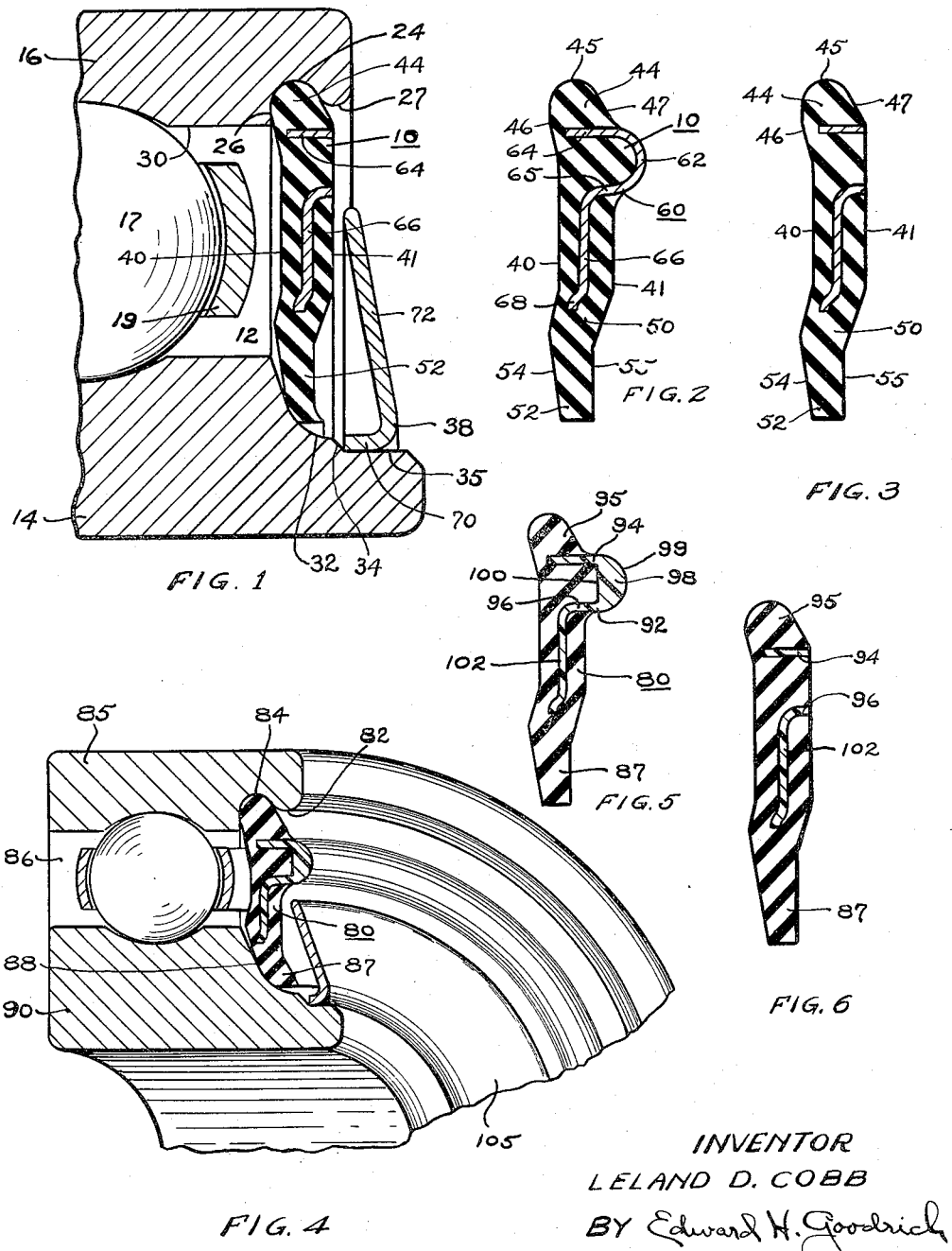

2,962,308

DEMOUNTABLE CLOSURE

Leland D. Cobb, Forestville, Conn., assignor to General Motors Corporation, Detroit, Mich., a corporation of Delaware Filed Dec. 27, 1956, Ser. No. 630,884

4 Claims. (Cl. 286—5)

This invention relates to a demountable closure for closing the annular space between a pair of relatively rotatable members and more particularly to a demountable seal for maintaining lubricant between a pair of relatively rotatable race rings of an antifriction bearing and preventing the ingress of dirt and deleterious material into the bearing.

It is common practice to permanently install seals at the ends of the annular lubricant chamber between the relatively rotatable race rings of a ball bearing by expanding the folded-over metal rim of a shield into tightly wedged engagement against the walls of a groove in one of the race rings and to secure to this shield a flexible washer which is in wipingly sealing engagement with the other race ring. This permanent sealing arrangement in many instances is not satisfactory since it prevents relubrication of the bearing and prevents seal removal for cleaning the bearing. Additionally, the expanding of the shield rim into tightly wedged engagement frequently distorts one of the race rings and creates race ring inaccuracies causing unsatisfactory bearing performance and spoiling the required precision to which the bearing parts had been accurately ground. Furthermore, it is recognized that the operation of a bearing for even short periods at high temperature or under conditions of overload may cause the bearing lubricant to rapidly break down resulting in bearing failure. Hence, it is desirable in many instances that the seals in the ends of a bearing should be easily removable for cleaning and relubrication of the bearing.

It is, therefore, an object of this invention to provide an improved demountable closure of reinforced construction and which may be easily and repeatedly removed from and replaced in closing relation across the annular lubricant chamber between a pair of relatively rotatable members without creating injury to the closure or the relatively rotatable members.

It is a further object to provide an improved method for making a reinforced closure member which may be repeatedly snapped into and out of operating position in closing relation across the end of an annular lubricant chamber in an antifriction bearing without injury to the closure or to the members with which it is associated.

To these ends and also to improve generally upon devices of this character, this invention consists in the various matters hereinafter described and claimed. In its broader aspects, the invention is not necessarily limited to the specific structures nor to the method of making a seal selected for illustrative purposes in the accompanying drawings wherein—

Figure 1 is a fragmentary cross sectional view through a portion of an antifriction bearing showing one form of my sealing arrangement assembled therewith.

Figures 2 and 3 show two different embodiments of my demountable sealing washer.

Figure 4 is a fragmentary perspective view showing another embodiment of my seal in demountable closing relation in the end of an antifriction bearing.

Figure 5 is an enlarged cross section of the sealing washer employed in Figure 4.

Figure 6 is an enlarged fragmentary cross section of another embodiment of my sealing washer.

My closure or sealing washer, as 10, which preferably comprises a reinforced deformably resilient member, may be repeatedly mounted in and removed without damage from sealing relation across the end of an annular lubricant chamber 12 between a pair of relatively rotatable annular members such as the inner and outer race rings 14 and 16 of an antifriction bearing provided with the usual raceways that receive rolling elements, as balls 17, guided by a cage or separator 19. An annular seal-receiving groove 24 is provided at one or both ends of the race ring 16 to demountably receive the sealing washer 10. This seal-receiving groove 24 is transversely curved between an annular shoulder 26 and a transversely rounded annular land 27 whose diameter is intermediate between that of the bottom of the groove 24 and of an inner cylindrical wall 30 of the race ring 16. An end of the inner race ring 14 radially opposite the seal-receiving groove 24 is provided with a transversely curved annularly extending notch 32 which may be sealingly engaged by a resilient lip of the sealing washer 10. The outer end of the notch 32 terminates in an annularly extending shoulder 34 and in a cylindrical land 35 over which is demountably pressed an annular slinger 38.

The sealing washer 10 is preferably composed of an inherently resilient material that may be produced by a simple molding operation under the influence of heat and pressure and which may be formed about a reinforcing member. This seal 10 may be composed of various rubber-like materials which will not deteriorate or appreciably change resiliency in the presence of heat, light, and bearing lubricants. I have found that one satisfactory synthetic rubber-like material for this sealing washer 10 may comprise a resilient vulcanized synthetic rubber containing a polymerization product of butadiene and acrylic nitrile. A synthetic polymeric amide, usually referred to as "nylon" and a polymeric tetrafluoroethylene, commonly referred to as "Teflon" are also examples of other materials which are well suited for the resiliently yieldable material of my sealing washer.

As illustrated in Figures 1, 2 and 3, my sealing washer has a pair of substantially parallel radially disposed inner and outer side walls 40 and 41 terminating at their outer ends in an angularly offset annular bead 44 having a transversely curved peripheral wall 45 merging with an inner frusto-conical wall 46 and with an outer frusto-conical wall 47. The radially inner ends of the walls 40 and 41 connect with a laterally offset tapering portion 50 from which generally radially extends an annular lip 52 having tapering side walls 54 and 55. The bead 44 is inherently resilient and may be laterally snapped past the rounded land 27 into firmly seated sealing relation within the groove 24 and against the shoulder 26 to locate the sealing washer 10 in radially extending closed relation across the end of the lubricant chamber 12 with the flexible sealing lip 52 in lightly deformed lateral sealingly wiping relation against the curved wall of the notch 32 as shown in Figure 1. The inner diameter of the sealing lip 52 terminates short of the bottom of the seal-receiving notch 32 so that the deformed light side wiping engagement of this sealing lip against the curved notch wall will provide an effective seal even in the event of slight misalignment of the inner and outer race rings 14 and 16.

A reinforcing ring 60, which may be stamped out and bent to form from suitable material, as sheet metal, is embedded throughout the major portion of its extent in the resilient sealing washer 10 to reinforce the bead 44 and also to laterally stiffen the body portion of the sealing washer. This ring has a laterally projecting transversely curved annular bulge 62 merging with a peripheral rim 64 embedded in the bead and merging with an annular flange 65 from which radially projects a disc-like extension 66 that terminates in a laterally offset annular portion 68 in the upper portion of the sealing lip 52. During manufacture of the sealing washer, the preformed reinforcing ring 60 is suitably located within a mold and the resilient rubber-like material is formed about and preferably bonded as by vulcanization to this reinforcing ring. As illustrated in Figure 2, a considerable portion of the outer curved wall of the bulge 62 is exposed and laterally projects beyond the outer side wall 41 of the sealing member 10. The peripheral rim 64 preferably extends in a generally axial direction through the major portion of the distance across the base of the bead 44 to provide an annular backing wall so that the bead will be resiliently compressed between this backing wall and the walls of the groove 24 to securely and demountably position this bead in firmly sealed relation within the groove 24 thereby locating the sealing washer 10 across the end of the bearing. During molding, the rubber-like resilient material flows past the ends of the ring to form the bead 44 and the lip 52. The rubber-like material grips against the reinforcing ring and preferably bonds to this ring as by vulcanization. If desired, the reinforcing ring 60 may be perforated to receive the molded material and aid the gripping action.

The body portion 66 which may be generally centrally located between the walls 40 and 41 has its inner end or stepped portion 68 extending only partially into the sealing lip 52 to provide the desired reinforcement to this lip and yet permit sufficient lateral resiliency of the lip to maintain a lightly wiping sealing engagement against the curved walls of the notch 32. If desired, after the molding operation the bulge 62 may be cut off along the plane of the outer wall 41, as shown in Figure 3, to provide added laterally resilient flexibility of the seal between the rim 64 and the flange 65.

The slinger 38 is preferably stamped out from sheet metal and bent to form to provide an annular mounting flange 70 which may be demountably pressed over the cylindrical land 35 and against the locating shoulder 34. A frusto-conical flange 72 of this slinger extends radially outwardly from the flange 70 and slightly angularly inwardly towards the sealing washer 10 into closely spaced relation therewith at its periphery. In accordance with the usual practice when the inner race ring 14 of the bearing rotates, the flange 72 serves in the capacity of a slinger to prevent dirt, dust, water and other deleterious materials from access to the sealing lip 52 thus further protecting the bearing. If desired, the bulge portion 62 may be left on the reinforcing ring 60 as shown in Figure 2 and the slinger flange 72 may terminate adjacent to the outer wall 41 of the sealing washer 10 and in closely spaced radial relation to the lower portion of the bulge 62.

In the embodiment of Figures 4 and 5, there is shown a demountable reinforced resilient sealing washer 80 of a generally similar shape as that of the sealing washer 10 and arranged to be removably snapped past an annular land 82 into a seal-mounting groove 84 in an outer race ring 85 to locate the sealing ring 80 in closing relation across the end of a lubricant chamber 86 with its resilient sealing lip 87 in lightly wiping relation with the rounded surface of an annular notch 88 in a rotatable inner race ring 90 all in generally a similar manner to that shown in Figure 1. In this construction the sealing washer 80 is formed as by a molding operation under heat and pressure generally similar to that used for the resilient sealing washer 10. However, the reinforcing ring 60 of Figure 2 is replaced by a molded reinforcing ring 92 which may be formed of various suitable materials such as a thermosetting plastic which will not be objectionably affected when the resilient rubber-like material of the member 80 is molded about and/or bonded to this reinforcing ring 82. As best illustrated in Figure 5, the upper portion of the reinforcing ring 92 is generally U-shaped in cross section, the upper leg of this U-shaped portion comprising a generally cylindrical rim 94 embedded in and extending the major portion of the distance across the base of a deformably resilient bead portion 95 and the lower leg of this U-shaped portion comprising an annular flange 96 embedded in the body portion of the washer 80. The rim 94 and the flange 96 are interconnected at 98 by a thickened portion having a merging curved outer wall 99 and a substantially flat inner wall 100. A disc-like body portion 102 connects with and extends radially inwardly from the flange 96 within and generally parallel to an intermediate portion of the resilient sealing member 80.

The sealing member 80 with its reinforcing ring 92 as shown in Figure 5, may be demountably installed in the end of an antifriction bearing as indicated in Figure 4 and a shield or slinger 105 may be demountably pressed over a cylindrical land of the inner race ring in the manner as generally shown in Figure 1. If desired, the transversely curved bulged portion 98 connecting the rim 94 and the annular flange 96, may be cut off in the plane of the outer face of the resilient sealing ring 80 as shown in Figure 6 and the resultant sealing washer may be installed instead of the washer 80 shown in Figure 4.

In the various embodiments illustrated and particularly in the embodiments shown in Figures 1, 3 and 6, it will be appreciated that the resiliency of the deformable washers may be controlled by the flexibility and resiliency of the reinforcing rings embedded in the sealing washer and also by the spacing between the annular reinforcing rim and the annularly disposed flanges which connect to the body portion 62 or 102. Additionally, the composition and consistency of the molded material of the members 10 and 80 as well as their lateral thickness controls the resiliency of the seals to hold the resiliently flexible sealing lips in the required lightly wiping sealing engagement with the inner race rings as shown.

I claim:

1. An annular closure for demountable positioning across the end of an annular lubricant chamber between a pair of relatively rotatable members one of which has an annular groove opening towards said other member, comprising a molded sealing washer of inherently resilient material, a resiliently deformable peripheral bead on the washer for demountable seated sealing engagement with the walls of said groove, a reinforcing disc embedded within and bonded to the body of the sealing washer to restrict its lateral flexibility, an annular flange on the disc laterally extending to the outer side wall of the washer, and an axially extending reinforcing ring embedded in the bead and radially spaced from said flange said reinforcing ring terminating at its inner end within the bead in spaced relation to the inner side wall of the sealing washer.

2. An annular closure for demountable positioning across the end of an annular lubricant chamber between a pair of relatively rotatable members one of which has an annular groove opening towards said other member, comprising an inherently resilient deformable washer for closing the end of the lubricant chamber, a resiliently deformable bead at the periphery of the washer and demountably seated in sealing engagement against the walls of said groove, an annular reinforcing ring embedded within and bonded to the washer and having an annular substantially radially disposed portion embedded within the body of the washer, a substantially cylindrical rim on the reinforcing member laterally extending into and embedded within the bead, and an annularly disposed laterally projecting U-shaped portion bonded to the washer and extending between the rim and the radial portion of said reinforcing member, said U-shaped portion axially projecting beyond the outer side wall of said washer.

3. An annular closure for demountable positioning across the end of an annular lubricant chamber between a pair of relatively rotatable members one of which has an annular groove opening towards said other member, comprising a washer of inherently resilient deformable material for mounting across the end of a lubricant chamber, said washer having a generally radial body portion, a resiliently deformable washer bead angularly disposed to the plane of said body portion and having a transversely rounded peripheral portion for demountable resiliently seated sealing engagement against the walls of said groove, an annular reinforcing disc embedded through the major portion of its extent within the washer and having an intermediate annular portion of substantially U-shaped cross section bonded to the washer and which laterally projects outwardly beyond one side of the washer.

4. An annular closure for demountable positioning across the end of an annular lubricant chamber between a pair of relatively rotatable members one of which has an annular groove opening towards said other member, comprising an inherently resilient sealing washer of molded rubber-like material extending across an end of the lubricant chamber, an annular bead conically projecting from the body portion of the sealing washer and demountably seated in sealing engagement against the walls of the groove, a resilient annular sealing lip at the inner washer periphery in lightly wiping sealing engagement with said other member, a molded reinforcing member within the sealing washer, said reinforcing member being provided with a radially disposed annular portion embedded within the body portion of the washer, an annular flange laterally extending from said radially disposed annular portion to the outer side wall of said washer, a continuous generally cylindrical rim on the reinforcing member and embedded within said bead in spaced relation to said radially disposed annular portion, and annularly extending U-shaped portion on the reinforcing member laterally projecting beyond the outer side of the sealing washer and connected to said flange and connected to said cylindrical rim.

References Cited in the file of this patent

UNITED STATES PATENTS

| | | |
|---|---|---|
| 2,251,012 | Delaval-Crow | July 29, 1941 |
| 2,419,885 | Cooper | Apr. 29, 1947 |
| 2,467,049 | Peterson | Apr. 12, 1949 |
| 2,580,816 | Morin | Jan. 1, 1952 |
| 2,630,601 | Schiffer et al. | Mar. 10, 1953 |
| 2,650,117 | Chambers et al. | Aug. 25, 1953 |
| 2,705,161 | Shafer | Mar. 29, 1955 |
| 2,723,869 | Cobb | Nov. 15, 1955 |
| 2,734,757 | Martin | Feb. 14, 1956 |
| 2,755,113 | Baumheckel | July 7, 1956 |
| 2,766,082 | Ritchey | Oct. 9, 1956 |
| 2,857,179 | Riesing | Oct. 21, 1958 |

FOREIGN PATENTS

| | | |
|---|---|---|
| 495,066 | Canada | Aug. 4, 1953 |